United States Patent
Bosco

(10) Patent No.: US 7,632,021 B2
(45) Date of Patent: Dec. 15, 2009

(54) HUB-BEARING UNIT FOR THE WHEEL OF A MOTOR VEHICLE

(75) Inventor: Domenico Bosco, Vibo Valentia (IT)

(73) Assignee: Aktiebolaget SKF, Gothenburg (SE)

( * ) Notice: Subject to any disclaimer, the term of this patent is extended or adjusted under 35 U.S.C. 154(b) by 118 days.

(21) Appl. No.: 11/318,282

(22) Filed: Dec. 23, 2005

(65) Prior Publication Data

US 2006/0215948 A1    Sep. 28, 2006

(30) Foreign Application Priority Data

Mar. 24, 2005    (EP)    ................................. 05102368

(51) Int. Cl.
    *F16C 19/08*    (2006.01)
(52) U.S. Cl. ....................... 384/544; 384/537
(58) Field of Classification Search .................. 474/54, 474/258, 448, 485, 513, 517, 490, 537, 544, 474/909; 180/258–259, 370, 385; 301/114, 301/105.1; 384/480, 541–543, 584, 537–539, 384/544; 29/894.36, 898.09
See application file for complete search history.

(56) References Cited

U.S. PATENT DOCUMENTS

| | | | | |
|---|---|---|---|---|
| 3,583,511 A | * | 6/1971 | Asberg ......................... | 384/544 |
| 4,113,328 A | * | 9/1978 | Vander Meulen ........... | 384/482 |
| 4,359,128 A | * | 11/1982 | Krude .......................... | 180/258 |
| 4,457,395 A | * | 7/1984 | Ernst et al. .................. | 384/909 |
| 4,493,388 A | * | 1/1985 | Welschof et al. ............ | 384/544 |
| 4,571,099 A | * | 2/1986 | Balken et al. ................ | 384/513 |
| 5,333,939 A | * | 8/1994 | Krude et al. ................. | 384/537 |
| 5,651,588 A | * | 7/1997 | Kato ............................ | 301/114 |
| 5,822,859 A | | 10/1998 | Kessen et al. | |
| 6,007,253 A | | 12/1999 | Rutter | |
| 6,112,411 A | * | 9/2000 | Rutter ....................... | 29/898.07 |
| 6,161,963 A | * | 12/2000 | Doell et al. .................. | 384/541 |
| 6,364,426 B1 | * | 4/2002 | Horne et al. ................. | 384/544 |
| 6,415,508 B1 | * | 7/2002 | Laps ....................... | 29/894.362 |
| 6,832,854 B2 | * | 12/2004 | Umekawa et al. ........... | 384/544 |
| 2003/0063827 A1 | * | 4/2003 | Webb et al. .................. | 384/544 |

FOREIGN PATENT DOCUMENTS

| | | | |
|---|---|---|---|
| DE | 19913024 A1 | * | 10/2000 |
| DE | 102 02 203 A1 | | 7/2003 |
| DE | 10305084 A1 | * | 8/2003 |
| DE | 10336797 A1 | * | 3/2005 |
| EP | 1153768 A1 | * | 11/2001 |

(Continued)

*Primary Examiner*—Marcus Charles
(74) *Attorney, Agent, or Firm*—Merchant & Gould P.C.

(57) ABSTRACT

A hub-bearing unit (10) for the wheel of a motor vehicle includes a hub (11) with a radial flange (13) and a central tubular portion (12) having an outer cylindrical surface (12*a*), and a bearing unit (15) with a dual set of rolling elements (16, 17) radially interposed between an outer, stationary bearing race (18) and first and second radially inner bearing races (19, 20) located side to side on the cylindrical outer surface (12*a*) of the tubular portion (12) of the hub. The hub forms a conical shoulder surface (21) diverging in an axially outer direction, and the first inner bearing race (19) has a conical surface (22) abutting against the conical shoulder surface (21) of the hub.

7 Claims, 1 Drawing Sheet

FOREIGN PATENT DOCUMENTS

| | | | |
|---|---|---|---|
| GB | 891 666 A | | 3/1962 |
| JP | 03031001 A | * | 2/1991 |
| JP | 2003042173 A | | 2/2003 |
| WO | WO 9703306 A1 | * | 1/1997 |
| WO | WO 2005008085 A1 | * | 1/2005 |

* cited by examiner

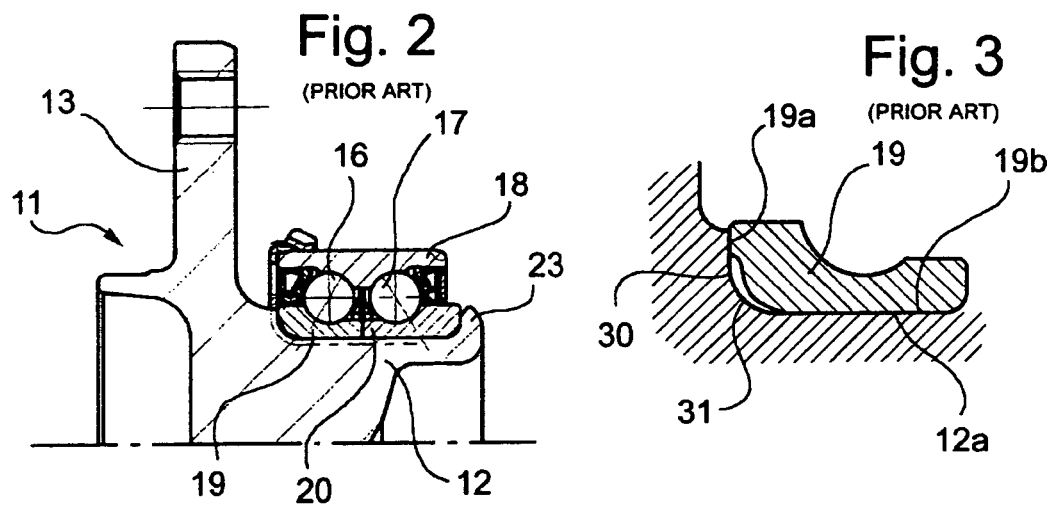
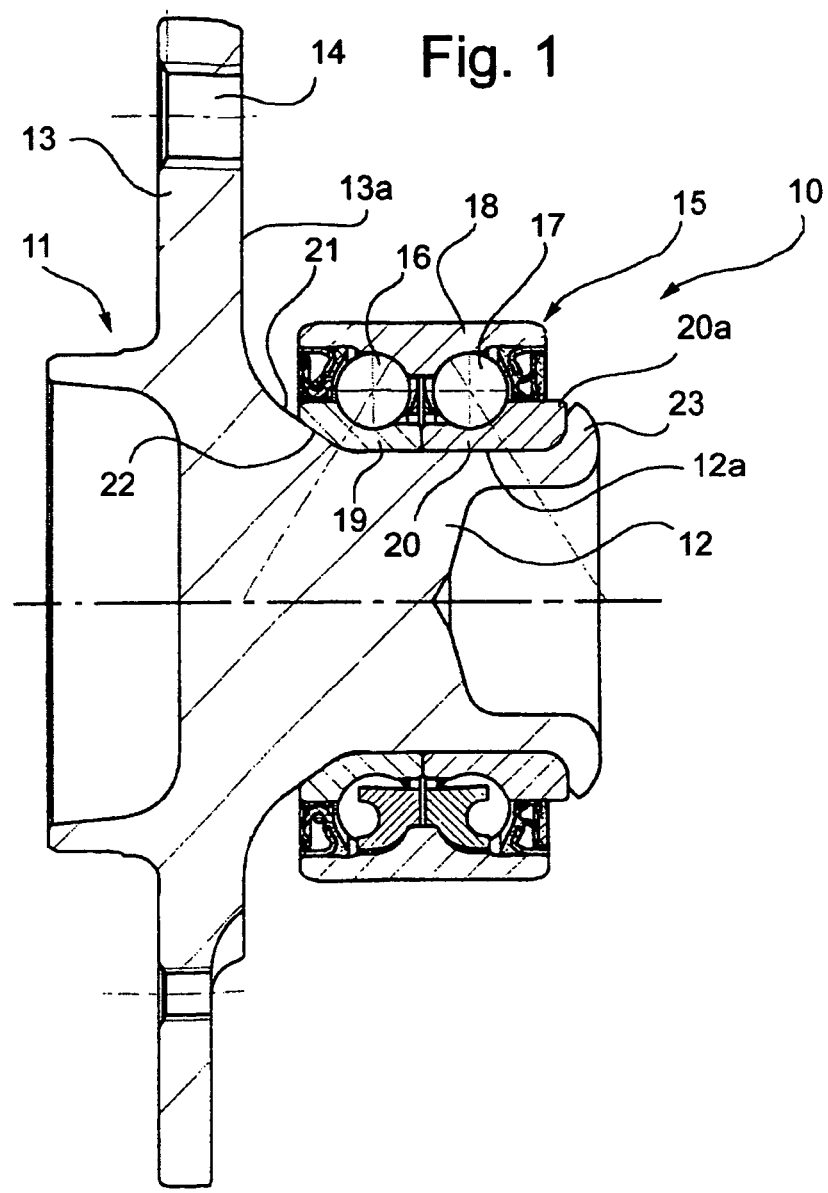

HUB-BEARING UNIT FOR THE WHEEL OF A MOTOR VEHICLE

BACKGROUND OF THE INVENTION

The present invention refers to a hub-bearing unit for the wheel of a motor vehicle, including a hub with a radial flange and a central tubular portion having an outer cylindrical surface. A hub-bearing unit of the above-mentioned type is known, for example, from U.S. Pat. No. 6,007,253.

For a better understanding of the state of the art and problems inherent thereto, there will be at first described a hub-bearing unit of known design, reference being made to FIGS. 2 and 3 of the accompanying drawings.

With reference to FIG. 2, a flanged hub 11 has a central portion of cylindrical tubular shape 12. Mounted around the tubular portion 12 is a bearing unit with a dual set of balls 16, 17 radially interposed between a stationary outer bearing race 18 that forms the outer raceways, and two radially inner bearing races 19, 20 located side to side and forming the inner raceways. The races 19, 20 are forcedly mounted on the outer cylindrical surface 12a of the tubular portion 12 of the hub. The inner race 19 located at the axially outer side (or outboard side) rests against a radial shoulder surface 30 of the hub 11. A curved radius 31 joins the outer cylindrical surface 12a to the radial surface 30. The axially inner end of the tubular portion 12 of the hub is plastically deformed, usually by orbital rolling so as to form an edge 23 projecting in a radially outward direction that locks and axially preloads the inner races 19, 20 on the hub, with the inner race 19 abutting the shoulder surface 30.

The base of the flange of the hub is one of the zones where a high concentration of stress occurs. Here, strain deriving from a bending stress reaches values requiring the hub to be previously subjected to an induction hardening heat treatment to improve structural strength of the hub.

The heat treatment inevitably deforms the surface of the hub on which the inner bearing race 19 is to be forcedly mounted. It is therefore necessary to carry out a further grinding treatment to eliminate roundness defects of that surface of the hub in order to attain a good forced coupling between the hub and the inner bearing race 19. The heat treatment and the subsequent grinding considerably affect manufacturing costs of the bearing unit.

However, it is necessary to carry out the above-mentioned heat treatment in order to avoid another drawback. As the steel of the hub is more yieldable than the hardened steel which the inner race 19 is made of, and the radial interface surface with the shoulder 30 has a very small area (see FIG. 3), the axial forces generated during rolling of the edge 23 are transferred to the shoulder surface 30 of the hub, and would yield in this surface—if not treated—a plastic deformation or impression that becomes deeper during the life of the bearing. As a matter of fact, in the absence of a heat treatment, when the hub-bearing unit undergoes high axial loads, the axial preload is lost and an axial play appears, causing jerks that are repeated with every turn of the wheel and that tend to form cracks in the hub.

SUMMARY OF THE INVENTION

The object of the present invention is to solve the above-discussed prior art problems, and particularly to cut down manufacturing costs of a hub-bearing unit of the afore-mentioned type.

These and other objects and advantages, that will be better understood hereinafter, are fulfilled, according to a first aspect of the present invention, by a hub-bearing unit.

BRIEF DESCRIPTION OF THE DRAWINGS

A preferred but not-limiting embodiment of the invention will now be described, reference being made to the accompanying drawings, in which:

FIG. 1 is an axial cross-sectional view of a hub-bearing unit according to the invention;

FIG. 2 is an axial cross-sectional view of a hub-bearing unit according to the prior art; and FIG. 3 is an enlarged view of a detail of FIG. 2.

DETAILED DESCRIPTION

Referring now to FIG. 1, a hub-bearing unit for the wheel of a motor vehicle according to the present invention is indicated overall 10. The hub-bearing unit 10 comprises a hub 11 with a central tubular portion 12 of cylindrical shape from an end of which (the end that in use is facing the outside of the vehicle) a radial flange 13 extends outwardly with axial bores 14 for wheel fastening studs (not shown). The hub-bearing unit further comprises a bearing unit 15 with a dual set of rolling elements 16, 17 (in this example balls) radially interposed between a stationary outer bearing race 18 and two radially inner bearing races 19, 20 located side to side. The inner races 19, 20 are fitted on the outer cylindrical surface 12a of the central tubular portion 12 of the hub.

According to the invention, the cylindrical surface 12a of the tubular portion 12 of the hub is joined to the radial surface 13a of the flange 13 by a substantially conical surface 21 diverging in an axially outer direction. The inner race 19 of the bearing unit has a substantially conical surface 22 abutting against the conical surface 21 of the hub. The inner race 19 is pressed and axially preloaded with its surface 22 abutting against the conical surface 21 of the hub by deforming (rolling) an edge 23 at the axially inner end of the tubular portion 12 of the hub against the axially inner side 20a of the race 20.

Owing to the extended area of contact between the conical surfaces 21 and 22, the contact pressure and the stress in the hub at the base of the flange are both lower as compared to prior art, and distributed more uniformly. Tests carried out by the Applicant have shown that contact pressure and stress in the zone of the conical surface 21 are almost halved with respect to the peak values detected in the zone of the surface 30 of the conventional unit of FIGS. 2 and 3. As a result, the conventional heat treatment and the following grinding are unnecessary and therefore can be avoided.

It will also be appreciated that the invention allows to simplify the working of the inner race 19. A conventional inner race 19 of the type shown in FIG. 3 requires two grinding operations, one on the radial face 19a and another one on the cylindrical surface 19b. With the present invention, grinding is still required on the cylindrical surface 19b, but it is sufficient to carry out a hard turning operation on the cylindrical surface 22, instead of a more expensive grinding.

The invention is not intended to be limited to the embodiment described and illustrated herein, which should be considered as an example of an embodiment of the hub-bearing unit. Rather, the invention may be modified with regard to the shape and arrangement of parts and to constructional and functional details. For example, the angles of the conical surfaces 21, 22 with respect to the longitudinal central axis x may range between 20° and 60° approximately. Preferably, the angle will range between about 30° and 35° for ball bearing units as in the example shown in the drawings. Tapered roller bearing units will generally require different angles. The invention is applicable to hub-bearing units of the kind having a dual set of balls, or a dual set of rollers, or still to hybrid bearing units having a set of balls and a set of rollers.

Prior to assembling the unit, the two conical surfaces 21, 22 will not necessarily have exactly equal angles with respect to the central axis x. The conical surface 22 of the race 19 will preferably have an inclination angle a few degrees less (for example 2°-6° less) with respect to the conical surface 21 of the hub. When the unit is preloaded by rolling the edge 23, contact between the conical surfaces begins at the axially outer side, and proceeds progressively towards the axially inner side, ensuring full contact of the conical surface 22. In this way, the race 19 remains somewhat elastically compressed between the race 20 and the conical surface 21 of the hub, and cooperates in preloading elastically the unit.

What is claimed is:

1. A hub-bearing unit for the wheel of a motor vehicle, including:
    a hub with a radial flange and a central tubular portion having an outer cylindrical surface,
    a bearing unit with a dual set of rolling elements radially interposed between an outer, stationary bearing race and first and second radially inner bearing races located side to side on the cylindrical outer surface of the tubular portion of the hub,
    wherein the first inner race of the bearing axially abuts against a shoulder surface formed by the hub at an axially outer end of the tubular portion,
    wherein the shoulder surface of the hub includes a substantially conical surface diverging in an axially outward direction and proximate a radial surface on the radial flange; wherein the first inner race of the bearing has a complementary substantially conical surface abutting against the conical shoulder surface of the hub, wherein the conical surfaces define angles ranging between about 20° and 60° with respect to a central longitudinal axis of the unit wherein the conical surface of the inner race forms an angle with the central longitudinal axis slightly narrower than the angle formed by the conical surface of the hub with the central longitudinal axis; and
    wherein the bearing unit is axially spaced apart from the radial surface at an axially outer end of the conical shoulder surface of the hub.

2. The hub-bearing unit of claim 1, wherein the tubular portion of the hub forms, at an axially inner end, an edge deformed so as to project radially outwardly against an axially inner side of the second inner race, for locking and axially preloading the inner races onto the hub, pressing the conical surface of the first race against the conical surface of the hub.

3. The hub-bearing unit of claim 2, wherein the conical surfaces define angles ranging between about 30° and 35° with respect to the longitudinal axis.

4. The hub-bearing unit of claim 2, wherein the angle formed by the conical surface of the inner race with the axis is about 2°-6° less than the angle formed by the conical surface of the hub with said axis.

5. The hub-bearing unit of claim 1, wherein the conical shoulder surface extends from the outer cylindrical surface of the tubular portion to the radial surface on the radial flange.

6. A hub-bearing unit having a longitudinal axis for the wheel of a motor vehicle, the hub-bearing unit comprising:
    a hub with a radial flange and a central tubular portion having an outer cylindrical surface,
    a bearing unit with a dual set of rolling elements radially interposed between an outer, stationary bearing race and first and second radially inner bearing races located side to side on the cylindrical outer surface of the tubular portion of the hub,
    wherein the first inner race of the bearing axially abuts against a shoulder surface formed by the hub at an axially outer end of the tubular portion, an axially inner end of the tubular portion of the hub forming a deformed edge projecting radially outwardly against an axially inner side of the second inner race, locking and axially preloading the inner races onto the hub, and pressing the conical surface of the first race against the conical surface of the hub;
    wherein the shoulder surface of the hub includes a substantially conical surface diverging in an axially outward direction and proximate a radial surface on the radial flange; wherein the first inner race of the bearing has a complementary substantially conical surface abutting against the conical shoulder surface of the hub, the conical surfaces defining angles ranging between about 20° and 60° with respect to the longitudinal axis of the unit and the conical surface of the inner race forms an angle with the longitudinal axis narrower than the angle formed by the conical surface of the hub with the longitudinal axis; the bearing unit being axially spaced apart from the radial surface at a axially outer end of the conical shoulder surface of the hub.

7. The hub-bearing unit of claim 6, wherein the angle formed by the conical surface of the inner race with the axis is about 2°-6° less than the angle formed by the conical surface of the hub with said axis.

\* \* \* \* \*